(12) United States Patent
Shaw

(10) Patent No.: US 6,230,698 B1
(45) Date of Patent: May 15, 2001

(54) ENGINE POLLUTANT FILTER SYSTEM

(76) Inventor: D. Robert Shaw, 4501 W. Kentucky Ave., #77, Denver, CO (US) 80219

( * ) Notice: Subject to any disclaimer, the term of this patent is extended or adjusted under 35 U.S.C. 154(b) by 0 days.

(21) Appl. No.: 09/495,336

(22) Filed: Feb. 1, 2000

(51) Int. Cl.[7] ................................................ F02M 25/00
(52) U.S. Cl. ........................................ 123/572; 123/25 A
(58) Field of Search .................................. 123/572, 573, 123/25 P, 25 F, 25 A, 41.14

(56) References Cited

U.S. PATENT DOCUMENTS

| | | | |
|---|---|---|---|
| 5,069,192 | * 12/1991 | Matsumoto et al. | 123/572 |
| 5,072,713 | * 12/1991 | Sweeten | 123/572 |
| 5,080,082 | * 1/1992 | Mueller et al. | 123/572 |
| 5,558,513 | * 9/1996 | Wentworth | 123/25 P |
| 5,592,903 | * 1/1997 | Wentworth | 123/25 A |
| 5,806,479 | * 9/1998 | Bauer et al. | 123/41.14 |
| 5,992,353 | * 11/1999 | Posselt | 123/25 F |

* cited by examiner

Primary Examiner—Marguerite McMahon
(74) Attorney, Agent, or Firm—David A. Lingbeck

(57) ABSTRACT

An engine pollutant filter system for providing cleaner exhaust and more massive power strokes. The engine pollutant filter system includes an engine having a positive crankshaft ventilation, a container member containing water and having a sealed cap with an intake port and an outlet port extending therethrough, and also includes a first hose member extending into the water container member and connected to the positive crankshaft ventilation of the engine, and further includes a second hose member connected to the outlet port and connected to the carburetor/fuel injector body. Steam mixture from the container member is drawn into the engine thus producing a cleaner burn, a cleaner exhaust and a massive power stroke due to the buildup of pressure effected by the heating of the steam mixture. In addition, a third hose is connected to the second hose and extends into the manifold or extends into the gas tank of the vehicle. Gas fumes from the gas tank are added to the steam mixture which gives the user better gas mileage more power and a cleaner burn.

15 Claims, 4 Drawing Sheets

ENGINE POLLUTANT FILTER SYSTEM

BACKGROUND OF THE INVENTION

1. Field of the Invention

The present invention relates to a hypro/hydro water filter system and more particularly pertains to a new engine pollutant filter system for providing cleaner exhaust and more massive power strokes.

2. Description of the Prior Art

The use of a hypro/hydro water filter system is known in the prior art. More specifically, a hypro/hydro water filter system heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new engine pollutant filter system. The inventive device includes an engine having a positive crankshaft ventilation, a container member containing water and having a sealed cap with an intake port and an outlet port extending therethrough, and also includes a first hose member extending into the water container member and connected to the positive crankshaft ventilation of the engine, and further includes a second hose member connected to the outlet port and connected to the carburetor/fuel injector body. Steam mixture from the container member is drawn into the engine thus producing a cleaner burn, a cleaner exhaust and a massive power stroke due to the buildup of pressure effected by the heating of the steam mixture. In addition, a third hose is connected to the second hose and extends into the manifold or extends into the gas tank of the vehicle. Gas fumes from the gas tank are added to the steam mixture which gives the user better gas mileage more power and a cleaner burn.

In these respects, the engine pollutant filter system according to the present invention substantially departs from the conventional concepts and designs of the prior art, and in so doing provides an apparatus primarily developed for the purpose of providing cleaner exhaust and more massive power strokes.

SUMMARY OF THE INVENTION

In view of the foregoing disadvantages inherent in the known types of a hypro/hydro water filter system now present in the prior art, the present invention provides a new engine pollutant filter system construction wherein the same can be utilized for providing cleaner exhaust and more massive power strokes.

The general purpose of the present invention, which will be described subsequently in greater detail, is to provide a new engine pollutant filter system apparatus and method which has many of the advantages of the a hypro/hydro water filter system mentioned heretofore and many novel features that result in a new engine pollutant filter system which is not anticipated, rendered obvious, suggested, or even implied by any of the prior art a hypro/hydro water filter system, either alone or in any combination thereof.

To attain this, the present invention generally comprises an engine having a positive crankshaft ventilation, a container member containing water and having a sealed cap with an intake port and an outlet port extending therethrough, and also includes a first hose member extending into the water container member and connected to the positive crankshaft ventilation of the engine, and further includes a second hose member connected to the outlet port and connected to the carburetor/fuel injector body. Steam mixture from the container member is drawn into the engine thus producing a cleaner burn, a cleaner exhaust and a massive power stroke due to the buildup of pressure effected by the heating of the steam mixture. In addition, a third hose is connected to the second hose and extends into the manifold or extends into the gas tank of the vehicle. Gas fumes from the gas tank are added to the steam mixture which gives the user better gas mileage more power and a cleaner burn.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new engine pollutant filter system apparatus and method which has many of the advantages of the a hypro/hydro water filter system mentioned heretofore and many novel features that result in a new engine pollutant filter system which is not anticipated, rendered obvious, suggested, or even implied by any of the prior art a hypro/hydro water filter system, either alone or in any combination thereof.

It is another object of the present invention to provide a new engine pollutant filter system which may be easily and efficiently manufactured and marketed.

It is a further object of the present invention to provide a new engine pollutant filter system which is of a durable and reliable construction.

An even further object of the present invention is to provide a new engine pollutant filter system which is susceptible of a low cost of manufacture with regard to both materials and labor, and which accordingly is then susceptible of low prices of sale to the consuming public, thereby making such engine pollutant filter system economically available to the buying public.

Still yet another object of the present invention is to provide a new engine pollutant filter system which provides in the apparatuses and methods of the prior art some of the advantages thereof, while simultaneously overcoming some of the disadvantages normally associated therewith.

Still another object of the present invention is to provide a new engine pollutant filter system for providing cleaner exhaust and more massive power strokes.

Yet another object of the present invention is to provide a new engine pollutant filter system which includes an engine having a positive crankshaft ventilation, a container member containing water and having a sealed cap with an intake port and an outlet port extending therethrough, and also includes a first hose member extending into the water container member and connected to the positive crankshaft ventilation of the engine, and further includes a second hose member connected to the outlet port and connected to the carburetor/fuel injector body. Steam mixture from the container member is drawn into the engine thus producing a cleaner burn, a cleaner exhaust and a massive power stroke due to the buildup of pressure effected by the heating of the steam mixture. In addition, a third hose is connected to the second hose and extends into the manifold or extends into the gas tank of the vehicle. Gas fumes from the gas tank are added to the steam mixture which gives the user better gas mileage more power and a cleaner burn.

Still yet another object of the present invention is to provide a new engine pollutant filter system that effectively reduces smog pollution due to many of the pollutants being removed from the engine.

Even still another object of the present invention is to provide a new engine pollutant filter system that also effectively allows the engine to operate more efficiently with more power.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
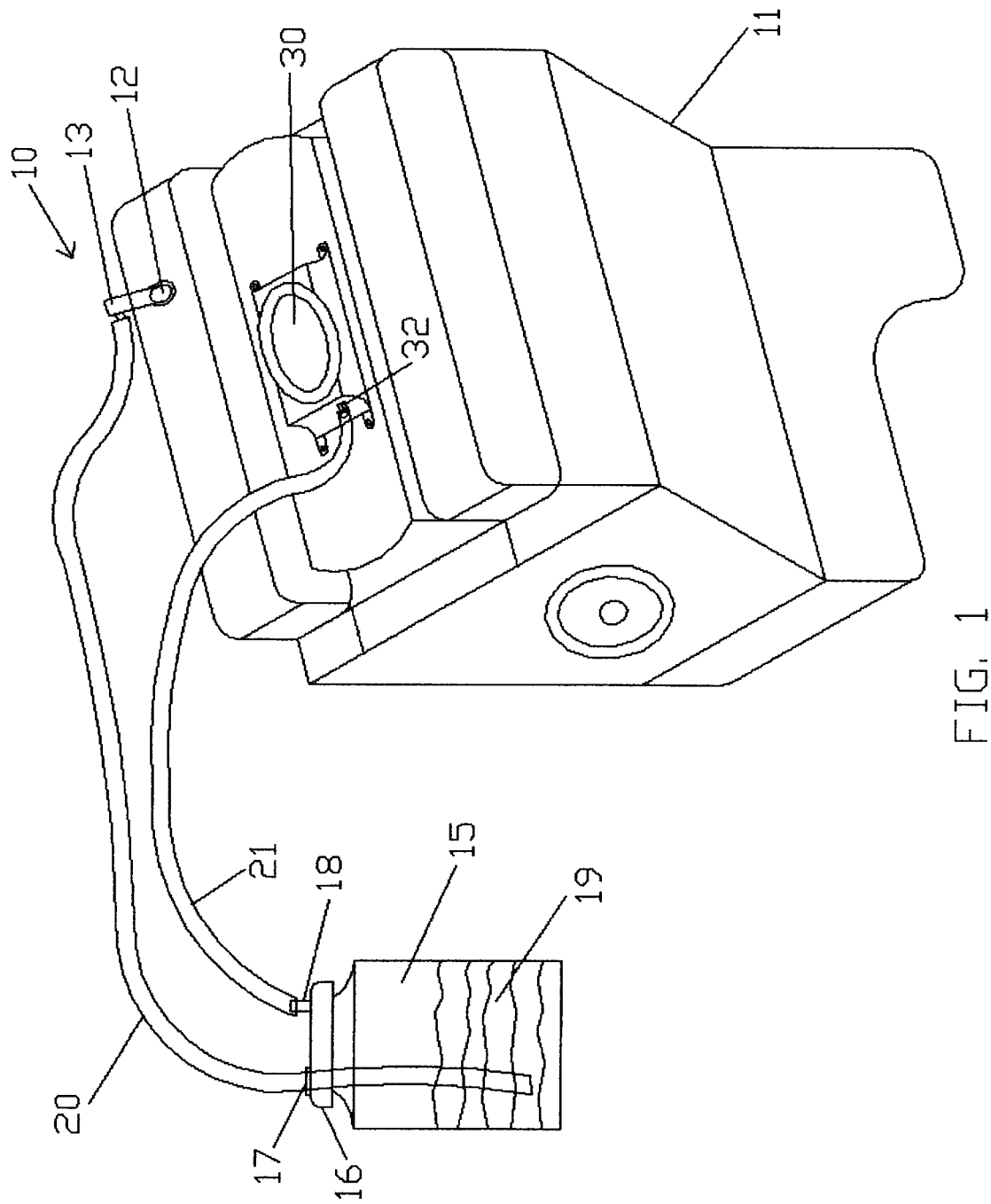
FIG. 1 is a perspective view of a new engine pollutant filter system according to the present invention.
Figure 2:
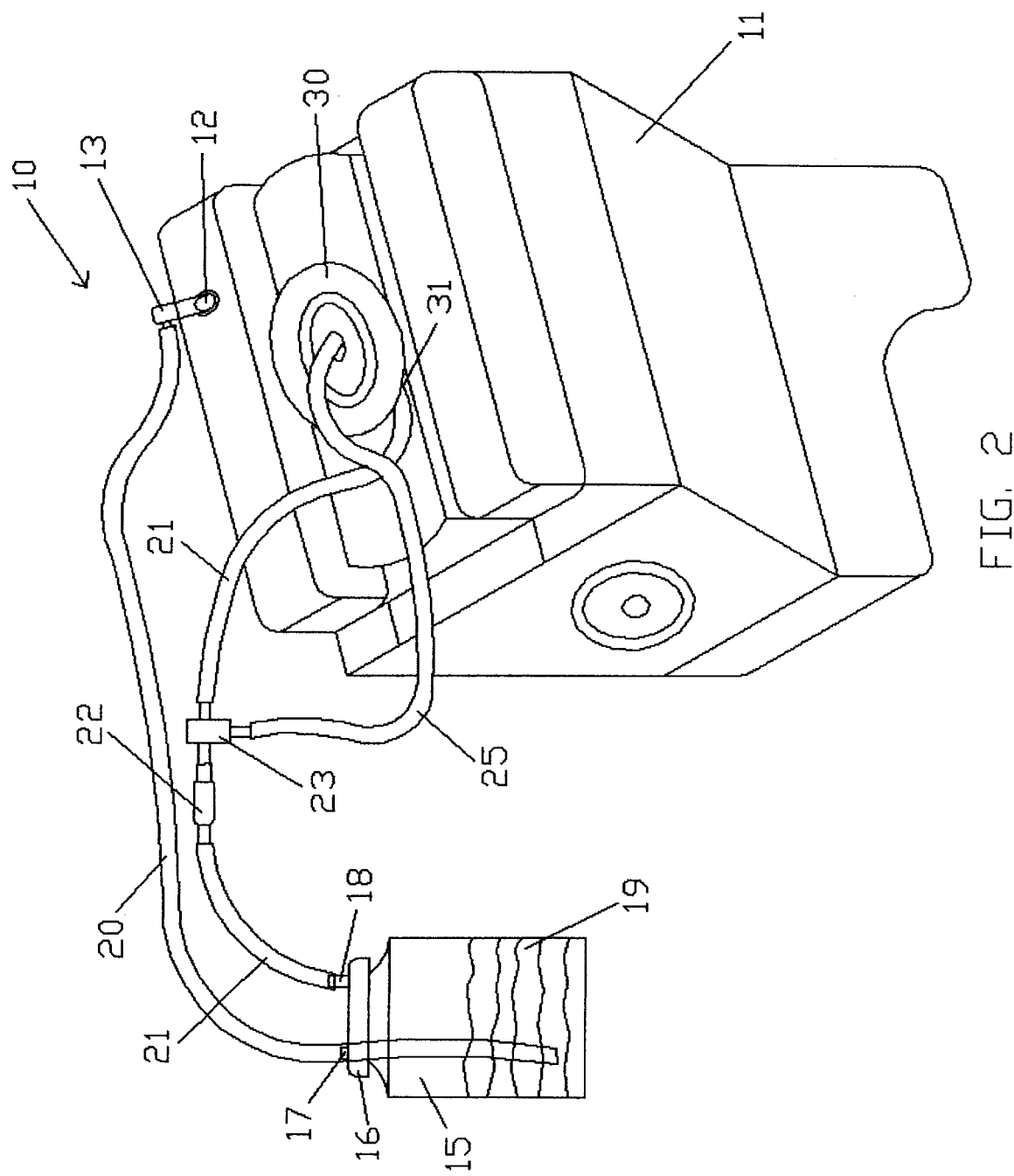
FIG. 2 is perspective view of the second embodiment of the present invention.
Figure 3:
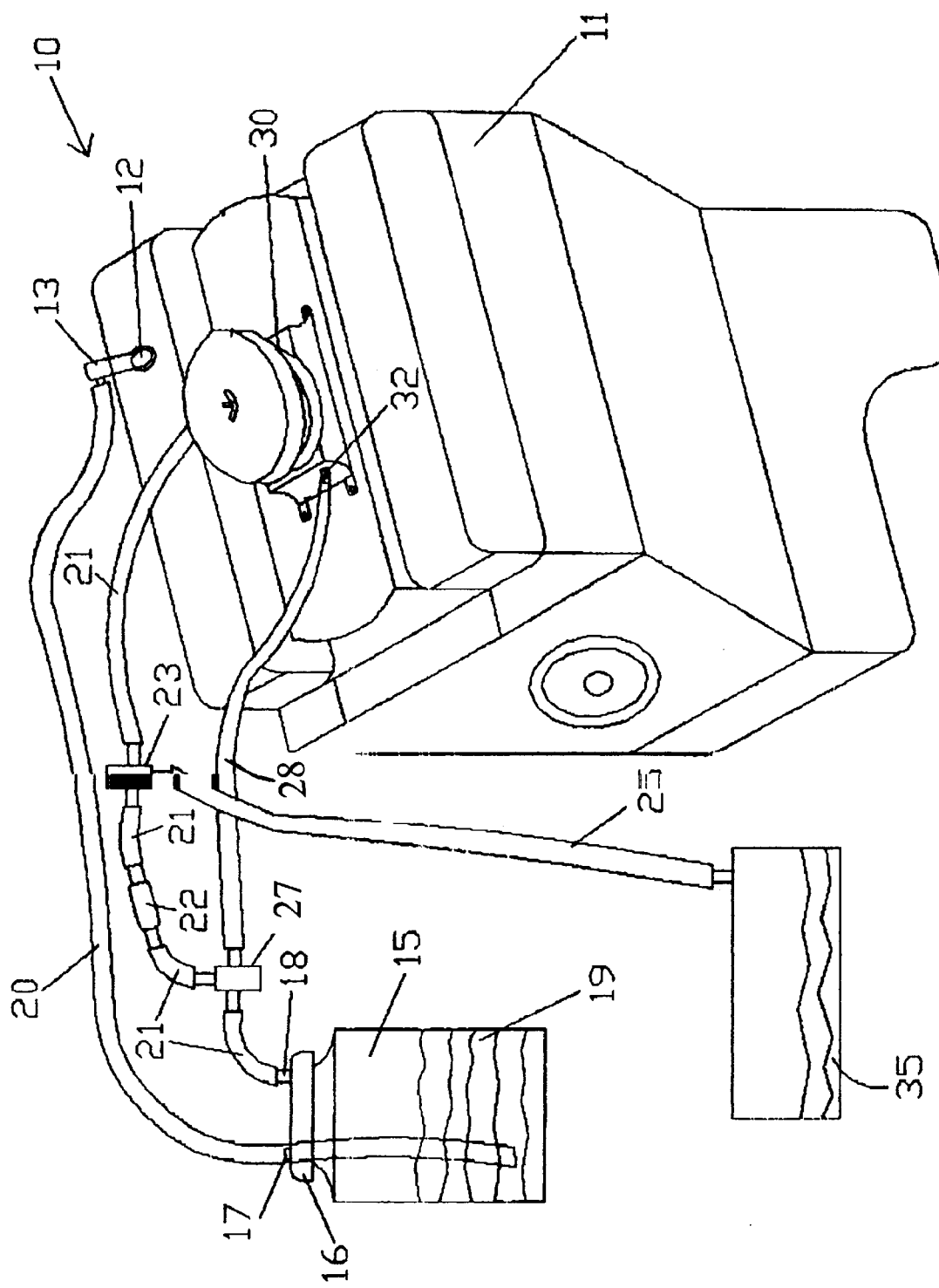
FIG. 3 is a perspective view of the third embodiment of the present invention.
Figure 4:
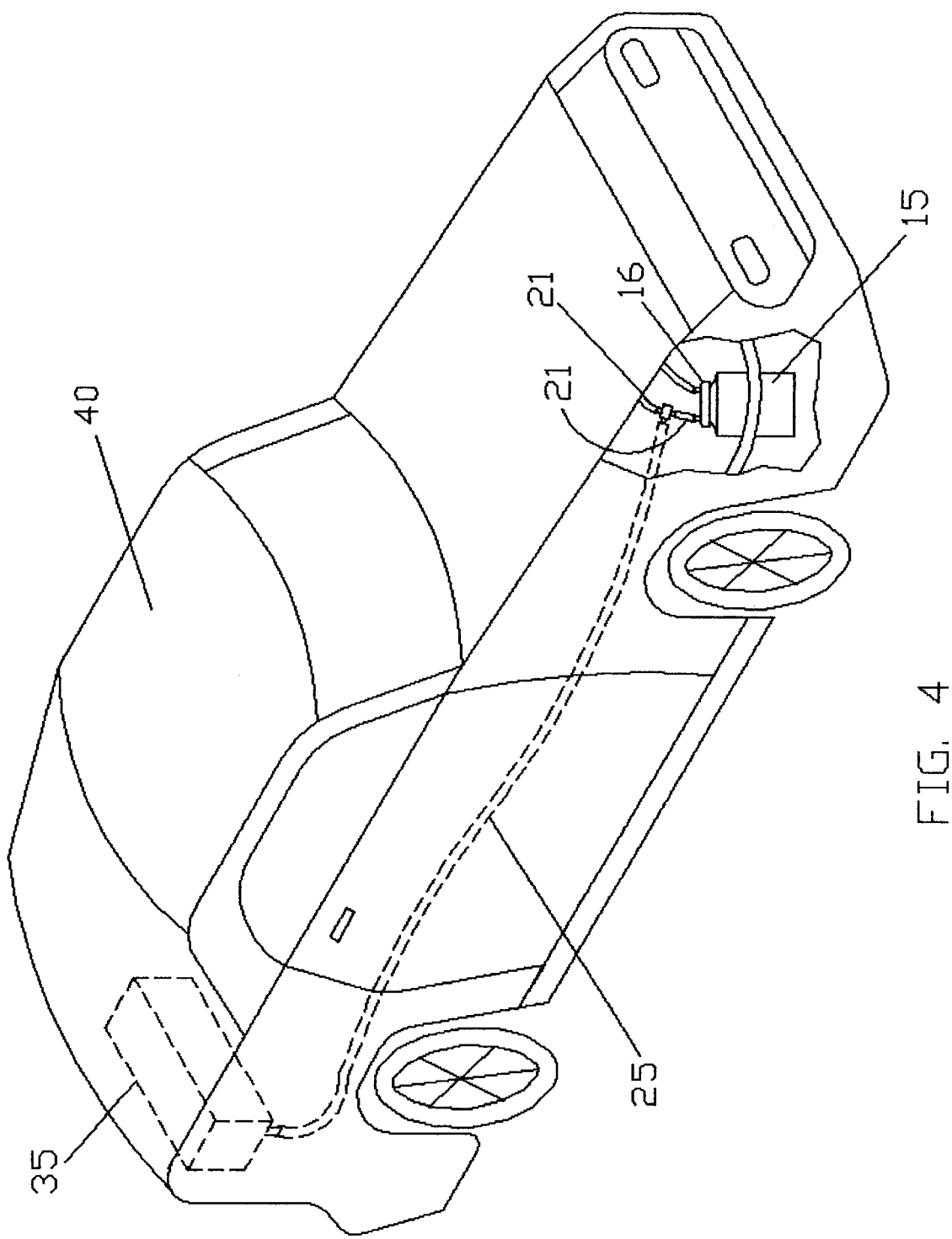
FIG. 4 is a perspective view of the third embodiment of the present invention as shown in relationship to vehicle.

With reference now to the drawings, and in particular to FIGS. 1 through 4 thereof, a new engine pollutant filter system embodying the principles and concepts of the present invention and generally designated by the reference numeral 10 will be described.

As best illustrated in FIGS. 1 through 4, the engine pollutant filter system generally comprises an engine 11 having a positive crankcase ventilation 12, a container member 15 containing water 19 and having a sealed cap 16 which includes an intake port 17 and an outlet port 18 extending therethrough with the container member 15 being connected to the engine 11, and a means for connecting the container member 15 to at least the engine 11 including a first hose member 20 being connected to a valve such as PVC valve which is securely and conventionally disposed at the positive crankcase ventilation 12 of the engine 11, and being extended into the container member 15 through the intake port 17, and also including a second hose member 21 being connected or conventionally fastened to the outlet port 18 and being conventionally connected to an air intake member 30 of the engine 11. The air intake member is an engine carburetor/fuel injector body 30. As a second embodiment, the means for connecting the container member to at least the engine further includes a valve 22 securely and conventionally disposed in line of the second hose member 22, and further includes an inline coupler 23 such as a T-coupler which is securely and conventionally connected to the valve 22 and to the second hose member 21, and also includes a third hose member 25 being securely and conventionally connected to a manifold 31 of the engine 11 and being conventionally connected to the inline coupler 23. As a third embodiment, the means for connecting the container member 15 to at least the engine includes a second inline coupler 27 securely and conventionally connected to the second hose member 21 and to fourth hose member 28 which is conventionally connected to the engine manifold 32, and also includes a valve 22 securely and conventionally disposed in line of the second hose member 21, and further includes an inline coupler 23 securely and conventionally connected to the valve 22 and to the second hose member 21, and also includes a third hose member 25 being conventionally connected to the inline coupler 23 and to a gas tank 35 of a vehicle 40.

In use, the engine pollutant filtering system 10 draws pollutants and hydrocarbons into the water 19 in the container member 15 from the positive crankcase ventilation 12 by using a vacuum effected by the engine 11 at the air intake member 30 to draw the pollutants and hydrocarbons through the first hose 20 from the positive crankcase ventilation 12 of the engine 11 into the water 19. The heat from the engine 11 effects or creates a steam mixture of lightweight particulates using heat from the engine 11 to heat the water, the pollutants, and the hydrocarbons thus effecting a steam mixture, and this steam mixture is drawn into the engine 11 through the second hose 21 thus leaving the heavy pollutants and particulates in the container member 15. The steam mixture is drawn into the engine 11 by means of the air intake member 30 which essentially comprises the carburetor/fuel injector body. The steam mixture essentially effects a massive power stroke because of the buildup of the steam mixture and a cleaner burn and a cleaner exhaust with the exhaust comprising steam. In the second embodiment, the steam mixture is drawn through the second hose member 21 into the carburetor/fuel injector body 30 and through the third hose member 25 into the manifold 31. In the third embodiment, the steam mixture that is drawn into the engine 11 includes drawing gas fumes from the gas tank 35 which is drawn through the third hose member 25 and includes drawing the steam mixture into the engine manifold through the fourth hose member 28. The steam mixture entering the engine 11 is dense and furthers facilitates as a lubricant.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An engine pollutant filter system comprising:
   an engine having a positive crankcase ventilation;
   a container member containing water and having a sealed cap which includes an intake port and an outlet port extending therethrough, said container member being connected to said engine; and
   a means for connecting said container member to at least said engine including a first hose member being connected to a valve securely disposed at said positive crankcase ventilation of said engine, and being extended into said container member through said intake port.

2. An engine pollutant filter system as described in claim 1, wherein said means for connecting said container member to at least said engine also includes a second hose member being connected to said outlet port and being connected to an air intake member of said engine.

3. An engine pollutant filter system as described in claim 2, wherein said air intake member is an engine carburetor.

4. An engine pollutant filter system as described in claim 3, wherein said air intake member is a fuel injector body.

5. An engine pollutant filter system as described in claim 4, wherein said means for connecting said container member to at least said engine includes a valve securely disposed in line of said second hose member, and further includes an inline coupler securely connected to said valve and to said second hose member, and also includes a third hose member being connected to a manifold of said engine and being connected to said inline coupler.

6. An engine pollutant filter system as described in claim 2, wherein said means for connecting said container member to at least said engine includes a second inline coupler connected to said second hose member and to a fourth hose member which is connected to an engine manifold, and also includes a valve securely disposed in line of said second hose member, and further includes an inline coupler securely connected to said valve and to said second hose member, and also includes a third hose member being connected to said inline coupler and to a gas tank of a vehicle.

7. A method of filtering pollutants and hydrocarbons of an engine includes the steps of:
   providing an engine, a container member containing water and a sealed cap having an intake port and an outlet port extending therein, a first hose member being connected to a valve at a positive crankcase ventilation of said engine and being extended into said container member through said intake port, and a second hose member being connected to said outlet port and being connected to an air intake member of said engine;
   drawing pollutants and hydrocarbons into the water in said container member from said positive crankcase ventilation;
   effecting a steam mixture;
   drawing said steam mixture into said engine thus leaving heavy pollutants and particulates in said container member; and
   effecting a massive power stroke and a cleaner burn and a cleaner exhaust.

8. A method of filtering pollutants and hydrocarbons of an engine as described in claim 7, wherein said step of drawing pollutants into the water includes the step of using a vacuum effected by the engine to draw the pollutants and hydrocarbons through said first hose from said positive crankcase ventilation of said engine into the water.

9. A method of filtering pollutants and hydrocarbons of an engine as described in claim 8, wherein the step of effecting a steam mixture includes using heat from said engine to heat the water, the pollutants, and the hydrocarbons thus effecting a steam mixture.

10. A method of filtering pollutants and hydrocarbons of an engine as described in claim 9, wherein the step of drawing said steam mixture into said engine includes the step of using a carburetor/fuel injector body of said engine to draw said steam mixture through said second hose into said engine.

11. A method of filtering pollutants and hydrocarbons of an engine as described in claim 10, wherein the step of providing an engine, a container member, a first hose member, and a second hose member includes the step of providing a third hose member connected to said second hose member, said first hose member being connected to a carburetor/fuel injector body of said engine, said third hose member being connected to a manifold of said engine.

12. A method of filtering pollutants and hydrocarbons of an engine as described in claim 11, wherein the step of drawing said steam mixture into said engine includes drawing said steam mixture through said second hose member into said carburetor/fuel injector body and through said third hose member into said manifold.

13. A method of filtering pollutants and hydrocarbons of an engine as described in claim 12, wherein the step of providing an engine, a container member, a first hose member, and a second hose member includes the step of providing a third hose member connected to said second hose member and a fourth hose member connected to said second hose member and to an engine manifold, said first hose member being connected to a carburetor/fuel injector body of said engine, said third hose member being connected to a gas tank of a vehicle.

14. A method of filtering pollutants and hydrocarbons of an engine as described in claim 13, wherein said step of drawing said steam mixture into said engine includes drawing gas fumes from said gas tank through said third hose member and drawing said steam mixture into an engine manifold through said fourth hose member.

15. A method of filtering pollutants and hydrocarbons of an engine as described in claim 10, wherein said steam mixture entering said engine is dense and furthers facilitates as a lubricant.

* * * * *